UNITED STATES PATENT OFFICE.

LEON PIERRE FEDERMEYER, OF LEADVILLE, COLORADO, ASSIGNOR TO HIMSELF AND ALFRED BRISBOIS, OF SAME PLACE.

HAIR-TONIC.

SPECIFICATION forming part of Letters Patent No. 338,942, dated March 30, 1886.

Application filed September 17, 1885. Serial No. 177,326. (No specimens.)

*To all whom it may concern:*

Be it known that I, LEON PIERRE FEDERMEYER, of Leadville, in the county of Lake and State of Colorado, have invented a new and useful Improvement in Medical Compounds, of which the following is a description.

My invention is in the nature of a new composition of matter designed as a tonic for the scalp, for the removal and prevention of dandruff, and for stimulating the growth of the hair and preventing the latter from falling out. It is also useful for the treatment of itching of the scalp, ring-worm, and red spots, and prevents the hair from turning gray; and also, further, it forms a very useful application after shaving to harden the skin and prevent pimples.

The composition consists of tincture Peruvian bark, tannin, water, sulphuret of potash, common salt, alcohol.

In compounding the tonic, I take first one pound of Peruvian bark and forty-two ounces of alcohol and leave it to macerate for eight days. The liquid is then decanted into a gallon-bottle, and to it fifty grains of tannin is added and allowed to macerate for twenty-four hours. I then dissolve in eight ounces of water twenty-five grains of sulphuret of potash, and in eight other ounces of water I dissolve sixty grains of common table-salt. After the sulphuret of potash and the salt are dissolved, they are both decanted into the gallon-bottle with the tincture of Peruvian bark and tannin, and the whole allowed to stand for forty-eight hours, after which the gallon-bottle is filled with distilled water and alcohol until it reaches the strength of thirty-five per cent. alcohol, after which it is again allowed to stand forty-eight hours. It is then filtered and perfumed with one ounce of the extract of "Lovely Boquet," or other perfume, after which it is ready for use.

Having thus described my invention, what I claim as new is—

The composition or hair-tonic herein described, consisting of tincture Peruvian bark, tannin, sulphuret of potash, common salt, alcohol, water, and a perfume, compounded in or about the proportions described.

LEON PIERRE FEDERMEYER.

Witnesses:
R. G. MARSH,
J. H. OLDS.